United States Patent

[11] 3,617,743

[72] Inventors Jacob G. Rabatin
　　　　　　　Chardon, Ohio;
　　　　　　　Robert A. Sieger, Greenfield, Wis.
[21] Appl. No. 769,894
[22] Filed Oct. 23, 1968
[45] Patented Nov. 2, 1971
[73] Assignee General Electric Company

[54] X-RAY IMAGE CONVERTORS UTILIZING LANTHANUM AND GADOLINIUM OXYHALIDE LUMINESCENT MATERIALS ACTIVATED WITH TERBIUM
12 Claims, 8 Drawing Figs.

[52] U.S. Cl. .................................................. 250/71,
　　　　　　　　　　　　　　　250/71.5, 250/77, 250/213
[51] Int. Cl. .................................................. G01t 1/20,
　　　　　　　　　　　　　　　H01j 31/50
[50] Field of Search ........................................ 250/71,
　　　　　　　　　　　　71.5, 213 T, 77; 252/301.4

[56] References Cited
UNITED STATES PATENTS
3,048,698 8/1962 Carlson ...................... 250/71.5

3,079,347 2/1963 Garrett et al. ................ 252/301.4
3,417,242 12/1968 Windebank .................. 250/213
　　　　　　FOREIGN PATENTS
6,610,903 2/1968 Netherlands ................ 252/301.4

Primary Examiner—James W. Lawrence
Assistant Examiner—Morton J. Frome
Attorneys—Richard H. Burgess, Henry P. Truesdell, Frank L. Neuhauser, Oscar B. Waddell and Melvin M. Goldenberg ABSTRACT: Oxyhalides of lanthanum and gadolinium, including the oxychlorides, oxybromides, and oxyiodides, activated with terbium and optionally sensitized with cerium are found to be some of the most efficient oxygen-dominated phosphors known, having radiant efficiencies with excitation by cathode rays of the same order of magnitude as the best sulfide phosphors. In the conversion of X-rays to visible light, these phosphors are superior in their conversion efficiency to the known X-ray phosphors. These new phosphors are useful in X-ray image-intensifier tubes, in fluoroscopic screens, in radiographic intensifier screens, in lamps and in cathode-ray tubes.

Inventor:
Jacob G. Rabatin
Robert A. Sieger
by Richard H. Burgess
Their Attorney Inventors:
Jacob G. Rabatin
Robert A. Sieger
by Richard H. Burgess
Their Attorney

X-RAY IMAGE CONVERTORS UTILIZING LANTHANUM AND GADOLINIUM OXYHALIDE LUMINESCENT MATERIALS ACTIVATED WITH TERBIUM

CROSS-REFERENCES TO RELATED APPLICATIONS

Processes for the production of luminescent materials of the present invention are described in more detail and are claimed in copending applications, filed concurrently herewith identified as FUSED SALT PROCESS FOR PRODUCING RARE EARTH OXYHALIDE AND OXIDE LUMINESCENT MATERIALS, Ser. No. 769,940, and GASEOUS REACTION PROCESS FOR THE PRODUCTION OF RARE EARTH OXYHALIDE AND OXIDE LUMINESCENT MATERIALS, Ser. No. 780,928, both filed in the name of Jacob G. Rabatin.

Other copending applications, filed concurrently herewith describe and claim related phosphors having different activators, and are identified as LANTHANUM AND GADOLINIUM OXYBROMIDE LUMINESCENT MATERIALS ACTIVATED WITH ERBIUM, Ser. No. 769,860, and LANTHANUM AND GADOLINIUM OXYHALIDE LUMINESCENT MATERIALS ACTIVATED WITH DYSPROSIUM, Ser. No. 769,922, both filed in the name of Jacob G. Rabatin. All of these four copending applications are assigned to the assignee of the present application.

A divisional application, claiming the luminescent materials of the present invention has been filed on Mar. 23, 1970 having Ser. No. 877,555 and entitled LANTHANUM AND GADOLINIUM OXYHALIDE LUMINESCENT MATERIALS ACTIVATED WITH TERBIUM AND X-RAY IMAGE CONVERTERS UTILIZING THE SAME.

BACKGROUND OF THE INVENTION

The present invention relates to luminescent materials, and more particularly to luminescent materials categorized as rare earth oxyhalides activated with terbium. The invention also relates to X-ray image converters utilizing such luminescent materials.

Prior to the present invention, oxide phosphors, also known as luminescent materials having oxygen-dominated lattices, have not generally been considered to have potential of achieving radiant energy efficiencies under cathode ray excitation anywhere near those of sulfide phosphors such as zinc sulfide and zinc-cadmium sulfide activated with silver or copper. Although the unavailability of certain emission characteristics in efficient sulfide phosphors, along with other factors, may make certain oxide phosphors commercially desirable in various applications, such as yttrium vanadate activated with europium for color television tubes, it remains a fact that the energy efficiencies of previously known oxide phosphors have been considerably lower than those of sulfide phosphors under cathode ray excitation. By radiant energy efficiency is meant the total energy radiated out of the phosphor divided by the total energy incident on an excited phosphor expressed as a percentage. For example, silver-activated zinc-cadmium sulfide phosphor under cathode ray excitation has been reported to have an energy efficiency of about 15 percent (other reports say it is about 20 percent,) while the relatively efficient oxide phosphors, such as ZnSiO$_4$:Mn and YVO$_4$:Eu, have efficiencies of about 6 percent, as compared to ZnCdS:Ag taken as 15 percent.

A critical application of phosphors in which energy efficiency is most important is their use in X-ray image conversion and image intensification. While cathode ray and X-ray excitations may give different efficiencies for the same phosphor, for may phosphors a high cathode ray efficiency indicates a high X-ray efficiency, provided the atomic number is high enough. As a matter of fact, phosphors are considered to be the most efficient X-ray to visible light converters. Thus, radiographic intensifier screens, fluoroscopic screens and X-ray image-intensifier tubes rely on phosphors in their operation. In order to keep exposure of patients to radiation as low as possible, it is imperative that X-ray phosphors should show high absorption toward X-rays and should have high X-ray to visible light conversion efficiencies.

Attempts have been made in the past to prepare and study rare earth oxyhalide phosphors. For instance, Blasse and Bril in "Investigations of Tb$^{3+}$-Activated Phosphors" in Philips Research Reports, 22, 481–504, 1967, describe materials to which they attribute the compositions of LaOCl:Tb and LaOBr:Tb. However, the radiant efficiency of the materials described by these authors are only 1 and 0.1 percent respectively under cathode ray excitation, as shown in table V on page 499 of the above-mentioned article. It is well known in the phosphor field that molecular composition alone cannot adequately describe or define a crystalline phosphor whose light production ability is greatly influenced by the crystal lattice as well as by its composition. Far more descriptive and characteristic information on phosphors can be obtained from their emission spectra. In FIG. 3 of the above-cited article, the authors present the emission spectrum of a phosphor described as LaOBr:Tb(5 %).

SUMMARY OF THE INVENTION

The present invention in certain of its embodiments comprises luminescent material comprising well-formed crystals of a material essentially according to the formula:

LnOX:Tb$^{+3}$(:Ce) wherein

Ln is one or more of La or Gd,

X is one or more of Cl, Br or I.

Tb$^{+3}$ is present in activator concentrations from a small but effective amount for the production of light up to about 30 mole percent of the composition, and Ce is optionally present in the range of about 0.1 to 1.0 mole percent. The above-described phosphors are highly efficient light producers under cathode ray, ultraviolet and X-ray excitation. They have a radiant energy efficiency when excited by a 20 -kilovolt cathode ray beam of at least about 10 percent.

Each of the permutations of lanthanum and gadolinium with oxygen and with chlorine, bromine and iodine in this composition is used in species of the invention. Although the presence of cerium is optional, this element has a desirable sensitizing effect especially under long wavelength ultraviolet excitation. The above-described compositions without cerium are also within the scope of the invention. Preferred ranges for terbium are from about 0.5 to about 15 mole percent based on the composition, and preferred ranges of cerium are from about 0.4 to about 0.8 mole percent based on the composition. For optimum performance, the halide content, X, should be within about plus or minus 2.5 percent of the stoichiometric amount of the halogen. To maintain stoichiometry, the Tb and Ce additions are made by substitution for equimolar amounts of Ln.

Embodiments of the invention include X-ray image converters such as radiographic intensifier screens and fluoroscopic screens comprising a terbium-activated phosphor of the invention; X-ray image-intensifier tubes comprising an X-ray-to-visible light converter screen made with a terbium-activated phosphor of the invention, a spectrally matched photo-emissive surface capable of converting the light image into an electron image, and a suitable electron-optic system capable of focusing and minifying said electron image onto a second, high-resolution phosphor screen also known as the exit screen, said phosphors of the invention based on lanthanum oxychloride or oxybromide or gadolinium oxychloride or oxybromide preferably containing 0.5 to 15.0 mole percent terbium.

Certain X-ray image converters of the invention comprise electric discharge tubes suitable for image intensification, a luminescent screen responsive to X-radiation, and a photocathode within said electric discharge tube and optically coupled to said screen, said luminescent screen comprising a phosphor capable of converting X-radiation to radiation of a longer wavelength, and said phosphor being a terbium-activated phosphor of the invention. Specific embodiments of such converters provide for the luminescent screen to be separated from the photocathode by no more than a small thickness of light-transmitting material, or for the optical coupling between the luminescent screen and the photocathode to be accomplished by fiber optic means or by means of at least one mirror surface.

Objects of this invention include providing highly efficient luminescent materials suited for excitation by ultraviolet and cathode rays and, most particularly by X-radiation.

Another object of the invention is providing improved X-ray-sensitive devices made possible by such luminescent materials.

Still another object is to provide such materials in a form sensitized to long wavelength ultraviolet radiation.

BRIEF DESCRIPTION OF THE DRAWINGS

FIG. 2 shows the emission curves of various phosphors of the invention under excitation by X-rays produced by the indicated peak kilovoltage (KVP)

DESCRIPTION OF THE PREFERRED EMBODIMENTS

Applicants have found that certain oxyhalides of lanthanum and gadolinium, activated with terbium, in form of well-formed and essentially stoichiometric crystals are very efficient light producers under electron, ultraviolet and X-ray excitation. Materials formed under conditions which lead to significant deviation from stoichiometric composition or which permit hydrolytic removal of halogen atoms of the oxyhalide radical, or the oxidation of the trivalent terbium to higher oxidation states will show decreased light production efficiency, possible discoloration and poorly crystallized particles. Deleterious effects may be caused by the formation of heterophase crystallites or by overcoating of phosphor crystals by other, nonluminescent compounds. Such undesirable changes are clearly indicated by reduction of light output and changes in emission spectrum even though they may go undetected by routine quantitative chemical analysis or routine X-ray diffraction analysis.

Figure 2A:
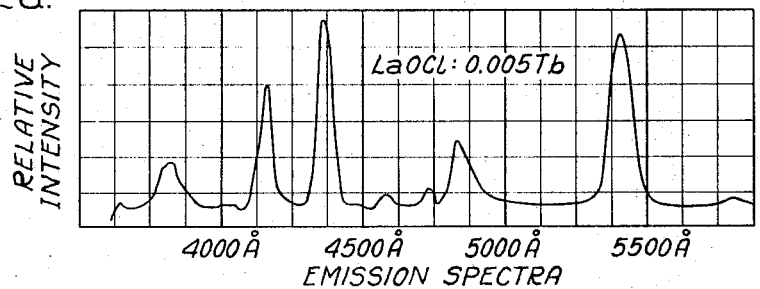
FIG. 2a—LaOCl:0.005Tb, 100 KVP.
Figure 2B:
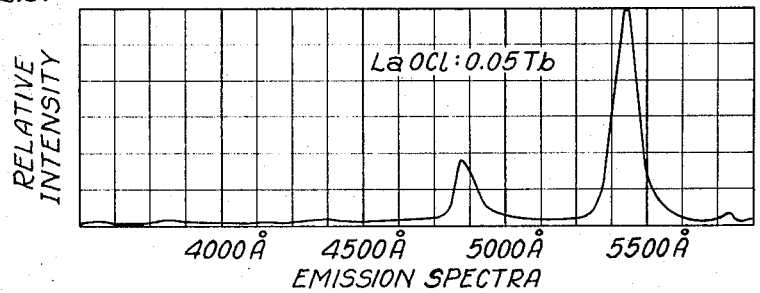
FIG. 2b—LaOCl:0.05Tb, 100 KVP; under cathode ray excitation.
Figure 2C:
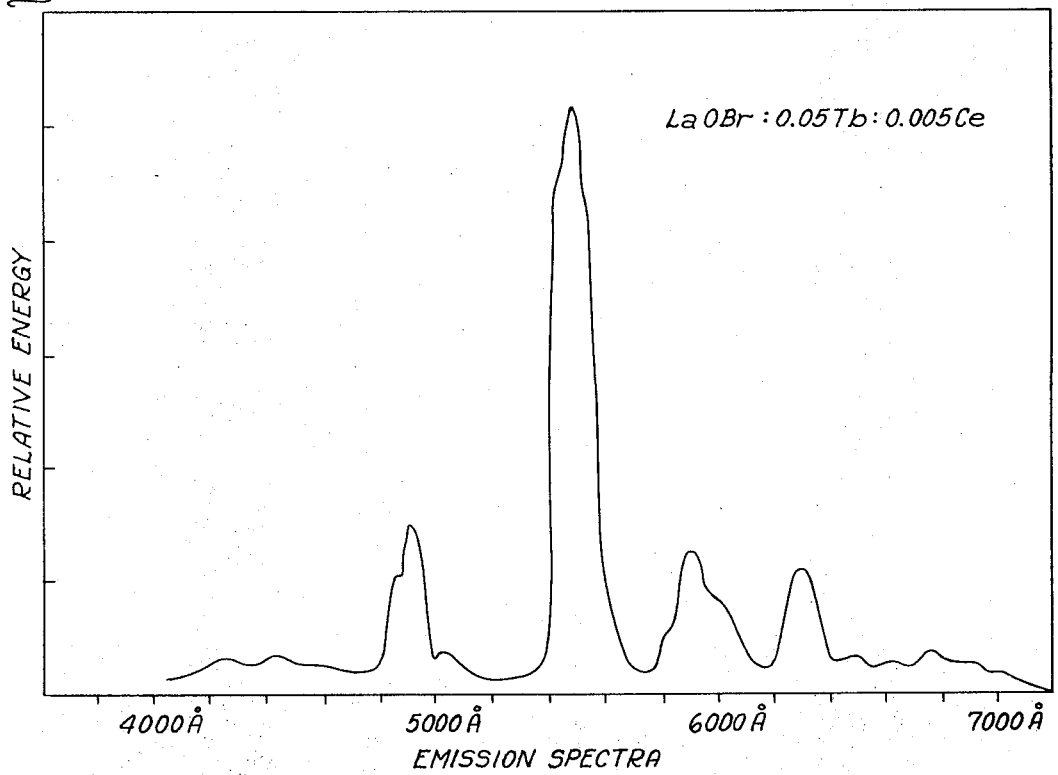
FIG. 2c—LaOBr:0.05Tb,0.005Ce, 20 kv. electron beam; and under 2,537 A. ultraviolet excitation.
Figure 2D:
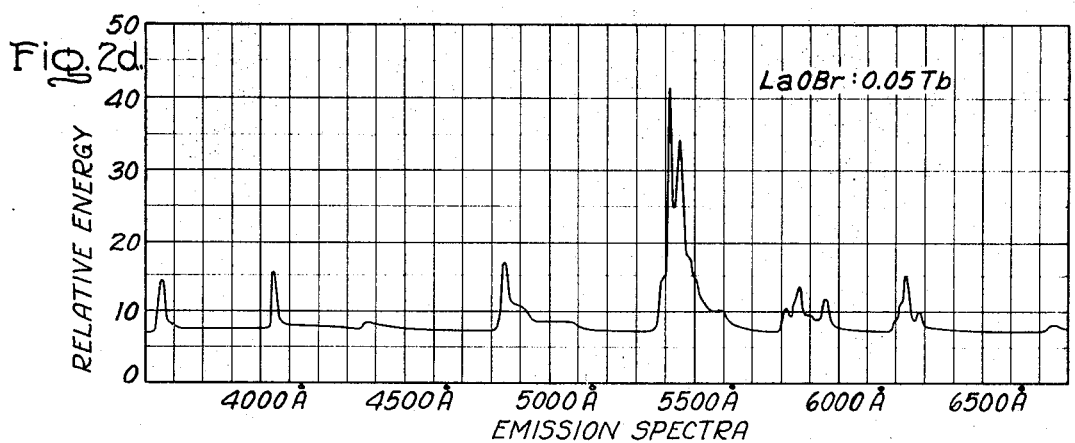
FIG. 2d—LaObr:0.05Tb.

It is interesting to note that the emission spectrum of this material of the above-identified Blasse and Bril article is significantly different from that of the corresponding material of the invention shown in FIG. 2d of this application even if we ignore for a moment the significantly higher light production efficiency of applicants' materials. The fact that applicants' discovery was quite unexpected is further underlined by Blasse and Bril's theoretical explanation on page 503 of said article as to why their material described as LaOBr:Tb is so inefficient.

Applicants have discovered new luminescent materials apparently not known or reported previously. These materials comprise well-formed crystals of certain terbium-activated oxyhalides of lanthanum and gadolinium as indicated above and formed in essentially stoichiometric proportions. For optimum light production efficiency, variances from the stoichiometric halogen content should not be greater than about plus or minus 2.5 percent.

Upon considering the emission spectra shown in FIGS. 2a, 2b, 2c and 2d, we find:

1. In the case of terbium-activated lanthanum oxychloride phosphors of this invention, under 100 KVP X-ray excitation, increasing terbium concentration leads to the strong quenching of emission peaks in the 3,700 to 4,700 A., region. (FIGS. 2a and 2b)

2. FIG. 2c shows the emission spectrum of cerium-sensitized and terbium-activated lanthanum oxybromide under 20 kv. electron beam excitation. Note the similarity to FIG. 2b indicating that electron beam and X-ray beam excitations are quite similar.

3. FIG. 2d shows emission spectrum of LaOBr:0.05Tb under 2,537 A. ultraviolet excitation. Comparing this spectrum with the spectrum of the lanthanum oxybromide phosphor of the above-identified Blasse and Bril article, we find that although both spectra have essentially the same spectral lines, the spectrum of the phosphor of this invention (FIG. 2d) clearly shows that most of the energy emitted is around 5,400 to 5,500 A. At the same time, the phosphor of Blasse and Bril emits with similar intensities at several wavelengths. Obviously, these are two different phosphors.

Figure 3:
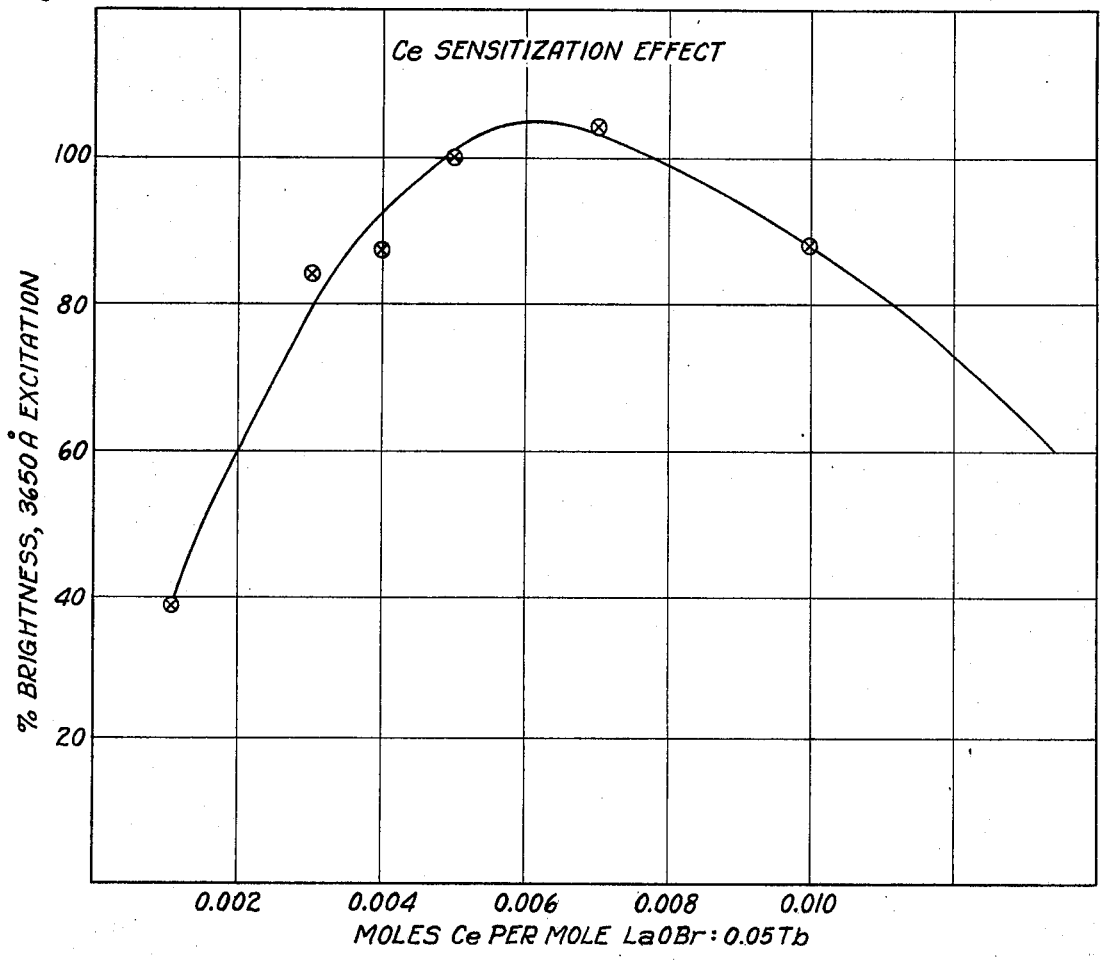
FIG. 3 shows the effect of cerium concentration on brightness of LaOBr:0.05Tb under 3,650 A. excitation.

4. In FIG. 3, we can see the effect of cerium concentration on brightness of LaOBr:0.05Tb under 3,650 A. ultraviolet excitation.

Satisfactory stoichiometric phosphors of the present invention can be made by either of at least two processes disclosed and claimed in the above-identified applications of Rabatin for fused salt and gaseous reaction processes. These processes will be briefly described below in terms of preferred preparation processes for production of terbium-activated lanthanum oxybromide. Analogous processes are used to prepare the oxychloride and oxyiodide of lanthanum as well as the oxyhalides of gadolinium with appropriate terbium activation with suitable adjustments for atomic weight.

In the course of the preferred preparation process, the appropriate amounts of lanthanum oxide and terbium oxide are dissolved in dilute nitric acid by boiling for a few minutes. After the solution is cooled to 50° to 60° C., 120 to 200 percent of the stoichiometric amount of oxalic acid is added under continuous agitation. Agitation is continued for about 5 minutes. The mixture is allowed to cool to room temperature. Finally, the coprecipitated oxalates of lanthanum and terbium are filtered off and dried at 100° C. in air. After drying, the precipitates is fired for 1 hour at 1,100° C. in air, thus converting it from the oxalate to the oxide form. In order to prevent pickup of undesirable impurities, firing is done in fused silica boats in fused quartz tubes. The resulting oxide is used as the starting material in preparation of the lanthanum oxybromide phosphor.

More specifically, 15.48 grams of 99.99 percent $La_2O_3$ and 0.94 grams of $Tb_4O_7$ were dissolved in $HNO_3$, coprecipitated as mixed oxalates, and fired to mixed oxides as described above.

In one of the preferred processes, the mixed oxide of lanthanum and terbium is blended with an alkali carbonate, such as $Na_2CO_3$ and also with ammonium bromide. After thorough mixing, the mixture is heated for 1 hour at 400° to 500° C. The mixture is then crushed, blended again and heated at least for 1 hour at 800 to 1,100° C. During the high-temperature firing, the lanthanum oxybromide, which was formed during the low-temperature heating step, is recrystallized. The mixture is then crushed, washed, filtered and dried. The resulting material is a well-crystallized, highly efficient terbium-activated lanthanum oxybromide phosphor. Inasmuch as the presence of alkali bromide formed by the interaction of alkali carbonate and ammonium bromide is not necessary for the formation of LaOBr:Tb, but only in the recrystallization process, the process may be modified by omitting the alkali carbonate before the first firing step and by adding an alkali bromide just prior to the second firing step.

The described method and its steps illustrate how phosphors of this invention may be prepared, but they should not be construed as limiting.

The second basic preparative process for obtaining highly efficient luminescent phosphors of the invention is as follows:

The mixed oxides of lanthanum and terbium are thoroughly blended with ammonium bromide. Then, the mixture is fired for 1 hour at 400° to 500° C. to form the terbium-activated lanthanum oxybromide. This material is then recrystallized by firing it at least for 1 hour in a hydrogen bromide-nitrogen atmosphere. Nitrogen acts as an inert gas, and thus it may be replaced with argon or other noble gases. Alternatively, addition of ammonium bromide may be omitted entirely, and the mixed oxides of lanthanum and terbium are fired in an HBr-containing inert atmosphere, thus combining the formation and recrystallization of LaOBr:Tb into a single firing step. This type of process is preferred for making the oxyiodides.

For optimum results, in the preparation of oxyhalides other than the oxybromides, minor modifications may be employed. Thus, in the case of LaOCl:Tb, HCl gas can be mixed with air, $CO_2$, $N_2$ or noble gases. Essentially pure $N_2$ is preferred as the carrier gas for handling HI to make the oxyiodide phosphors.

More specifically, the second basic preparative process may be carried out in the following way:

10 grams of the mixed oxide of lanthanum and terbium made as described above are placed into a fused silica boat and introduced into a fused quartz firing tube. The firing tube is flushed with an HBr-$N_2$ mixture flowing at a rate of 45 cm.$^3$/minute for 20 minutes before the firing tube is pushed into the hot zone of the furnace. The heating of the mixture is done for 1 hour at 1,200° C. while the HBr-$N_2$ mixture is flowing through the tube. At the end of 1 hour, addition of HBr is stopped. The mixture is fired for an additional 20 minutes with only $N_2$ flowing through the tube. Finally, the tube is removed from the hot zone and the mixture is allowed to cool in a flowing $N_2$ stream. The product is LaOBr:0.05Tb.

When desired, cerium is introduced into the starting material by dissolving its oxide in nitric acid together with oxides of lanthanum and terbium. Then, upon addition of oxalic acid, cerium is coprecipitated with lanthanum and terbium.

Although phosphors of the present invention have many uses including applications in cathode-ray tubes and lamps, their high X-ray absorption and high-light production efficiency under X-ray excitation assure them a rather unique role in radiographic intensifier screens, in fluoroscopic screens and especially in X-ray image intensifier tubes.

Figures 1, 1A:
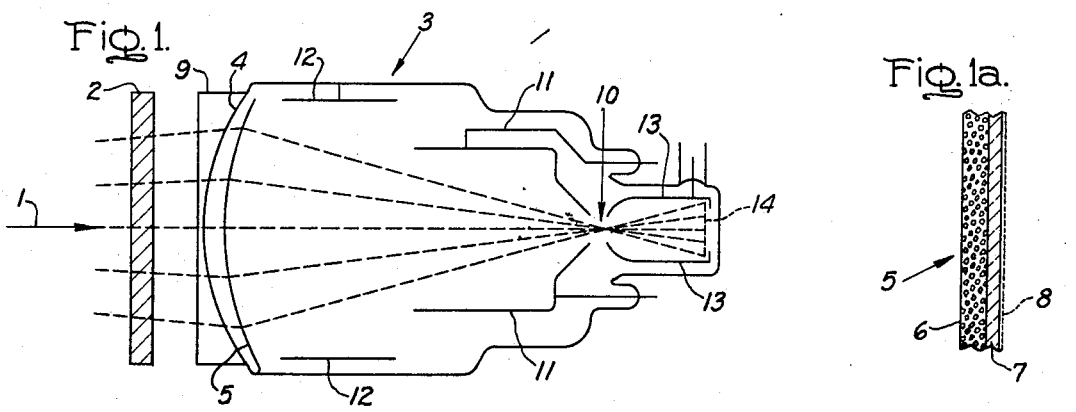
FIG. 1 is a schematic drawing of an X-ray image-intensifier tube.
FIG. 1a shows the magnified cross section of a phosphor-photocathode sandwich assembly used in that tube.

FIG. 1 shows the construction details of an X-ray image-intensifier tube which is quite similar to presently used devices. The high X-ray conversion efficiency of these phosphors is of great importance in industry's attempts to reduce patient dose during radiological examinations. As shown schematically in FIG. 1, the X-ray beam 1, after having passed through an object 2, enters the image intensifier tube 3 through its entrance window 4. Object 2 may be an inanimate object or, more particularly for the purposes of the invention, is part of the human body. Due to its particular structure, object 2 absorbs part of the radiation in a spatially nonuniform fashion, thus giving rise to an invisible X-ray image. A fraction of this X-ray image is converted to a visible image by the phosphor screen 6 which precedes photocathode 8. The phosphor screen 6, where the X-ray-to-visible image conversion takes place, is prepared from phosphors of this invention.

As shown in FIG. 1a, the phosphor-photocathode sandwich 5 is prepared by depositing the phosphor 6 on one side of a thin glass membrane 7 and then, preparing the photocathode 8 on the other side of said glass membrane. Alternatively, the phosphor screen 6 may be deposited directly on the vacuum side of entrance window 4 or on a thin aluminum plate by using a phosphor-silicone resin mixture, then covering the phosphor screen with a suitable, thin barrier film, such as an evaporated silicon monoxide film, and, finally, preparing the photo-emissive film on top of the barrier film. For optimum results, the emission spectrum of the phosphor and the excitation spectrum of the photocathode should be matched. Considering the emission characteristics of the phosphors of this invention, shown in FIGS. 2a, 2b, k2c and 2d, as well as the spectral sensitivity curves of the known photocathode materials, it is easy to see that the photocathode known as S-20 is a suitable choice. The spectra of FIGS. 2a and 2b have not been corrected for the response of the S-5 photodetector used to record the spectra.

The phosphor screen 6 converts the X-ray image to a visible image. This visible image is transferred to the photocathode 8, which converts it to an electron image. This electron image is continuously emitted by the photocathode, as long as the visible image is projected onto the photocathode surface. The emitted electron image is accelerated by the tube voltage from photocathode connection 9 toward the anode 13. In accordance with the known principles of electron optics, the electron image is focused by electrodes 11 and 12 through opening in anode 10 onto the high resolution, exit phosphor screen 14. Thus, we obtain an inverted and minified, but highly intensified image of the original visual image formed by the conversion of the X-ray image in phosphor screen 6. The image appearing on exit screen 14, also known as viewing screen, may be viewed with the aid of a mirror-lens system or be further amplified by a closed circuit video system and displayed on said video system's monitor. Alternatively, the image appearing on viewing screen 14 may be photographed with a suitable still or cine camera.

Another embodiment of this invention is an X-ray image intensifier tube similar to the one shown in FIG. 1, with the exception that entrance window 4, also known as the image tube's faceplate, is replaced by a fiber optic faceplate, phosphor screen 6 is formed on the outside of said fiber optic faceplate, while the photocathode 8 is deposited on the inside of said fiber optic faceplate.

Figure 5:
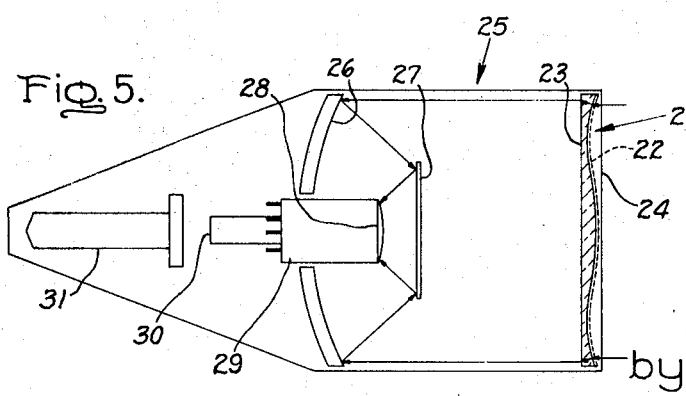
FIG. 5 is a schematic illustration of an X-ray image-intensifying system based on a phosphor screen, associated mirror optics and light-to-light amplifier tubes.

Still another embodiment of the present invention is shown in FIG. 5. The X-ray image converter screen 21 is formed by depositing a layer 22 of one of the phosphors of the invention on a member such as a correct plate 23 inside of faceplate 24 of the image intensifier system's light-tight housing 25. The visible image formed by the X-ray image converter screen 21 is focused by mirror optics 26, 27 of known design on the photocathode 28 of a light-to-light amplifier tube 29. The extreme light paths are traced by arrows in FIG. 5. The reduced size and intensified image, which appears on the viewing screen 30 of said light-to-light amplifier tuber 29 is further amplified by the closed circuit video system 31. The closed circuit video system 31 consists of a video camera which is connected to a matching video monitor where the highly intensified image is displayed. The video camera tube can be a vidicon tube or an image orthicon tube, these tubes being commercially available.

In radiographic applications, the intensifier screen is prepared by dispersing one of the phosphors of the invention in a suitable resin binder and then casting the screen on a supporting member according to techniques known in the art. Screens prepared with phosphors of this invention were compared to standard calcium tungstate radiographic screens. Using identical experimental conditions including radiation intensity, exposure time, type of film, and equivalent phosphor particle size, screens prepared with phosphors of the invention were about 4.5 times brighter than the corresponding calcium tungstate screens as shown by film densitometric measurements. Even better results for use of the invention could be expected if film were used which has spectral sensitivity extended to longer wavelengths.

In the conventional X-ray image intensifier tube, the first phosphor screen, where the X-ray image is converted to a visible image, represents a compromise between sensitivity or brightness and resolving power. In order to increase sensitivity and brightness, the X-ray conversion screen is relatively thick and prepared from large particle size phosphor crystals. Unfortunately, thick and coarse phosphor screens have lower resolving power than thin screens made with fine phosphor particles. The phosphors of this invention not only absorb more X-rays than ZnCdS:Ag, but are also more efficient light producers than ZnCdS:Ag. In table I below are compared the performance in terms of relative light output measured by an S-20 photocathode of silver-activated zinc-cadmium sulfide with terbium-activated lanthanum oxybromide, one of the phosphors of the invention. These measurements were all made with a screen weight of 100 mg./cm.$^2$ with 100 KVP X-ray excitation.

TABLE I

X-ray Screen Performance

| Phosphor | Phosphor Particle Size | Relative Light Output |
|---|---|---|
| ZnCdS:Ag | 50 microns | 100 |
| ZnCdS:Ag | 5 microns | 36 |
| LaOBr:Tb | 5 microns | 138 |

Figure 4:
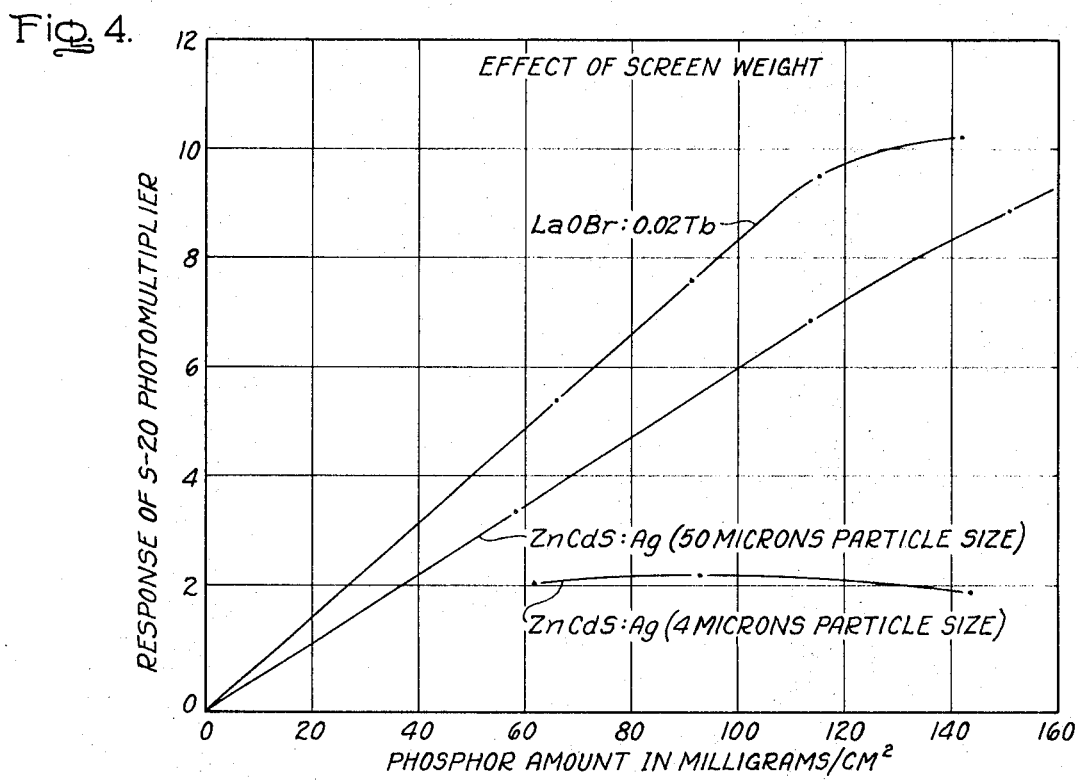
FIG. 4 shows the effect of screen weight, expressed as milligrams of phosphor per square centimeter, on brightness, measured by a S-20 photocathode, for the following phosphors:
a. LaObr:0.02Tb, 10 microns particle size
b. ZnCdS:Ag, 50 microns particle size
c. ZnCdS:Ag, 4 microns particle size
100 KVP X-ray excitation with 1-inch aluminum filtration.

Lanthanum oxybromide absorbs about twice as much X-rays in the diagnostic range as the same weight zinc-cadmium sulfide. The lanthanum oxybromide phosphor even at the 5-micron particle size generates more light than the zinc cadmium sulfide phosphor at 50-micron average particle size. In practical terms, this means that the phosphors of the invention offer better resolution and brighter images at the same radiation intensity or, alternatively, higher resolution at the same image brightness but at lower patient doses than is possible with the currently used zinc-cadmium sulfide X-ray conversion screen. The effect of screen weight on photomultiplier response is shown in FIG. 4.

Increased terbium concentration causes a shift in relative intensity of various spectral lines from a blue appearance at low concentrations to a yellow-green appearance at high concentrations. It has been found that between about 2 and 3.5 mole percent Tb in LaOBr, depending on firing treatment, gives optimum response with an S-20 commercial photo surface. For comparison, LaOBr:0.025Tb gives about 40 percent greater response than ZnCdS:Ag when both are coated on a suitable supporting member with a coating weight of about 100 milligrams per square centimeter.

Lanthanum oxyiodide activated with terbium was prepared by firing the mixed oxides of lanthanum and terbium 4 hours at 1,200° C. in a mixture of hydrogen iodide and nitrogen gases, each flowing at a rate of 45 cm.$^3$/min. Comparison made soon after preparation showed the lanthanum oxyiodide was 18 percent more efficient than ZnCdS:Ag when both were excited by X-rays at 100 KVP using 1-inch aluminum filtration. Some time after these tests, the lanthanum oxyiodide, which is colorless immediately after preparation, began to develop a yellow-brown color and lost some efficiency. This may have been due to insufficient protection against reaction with atmospheric gases. When the phosphor and its application have been optimized, not only may it prove to be initially superior to ZnCdS:Ag, but also improved constancy of performance may be obtained.

Measurements have been made on applicants' phosphors to show the quantum efficiency under excitation by 2,537 A. ultraviolet radiation and energy efficiency under 20-kilovolt cathode ray excitation. Values given herein are relative to an assumed value of 15 percent for ZnCdS:Ag used commercially as a green television phosphor and having 100 parts per million Ag and 40 weight percent CdS. Quantum efficiency is an approximate percentage expression of numbers of quanta out relative to numbers of quanta in, while energy efficiency is a percentage expression of energy output relative to energy input. For LaOCl:0.05Tb, the quantum efficiency was about 65 percent and the energy efficiency about 13.5 percent. Measurements for LaOBr:0.05Tb are about 85 percent quantum efficiency and about 16.5 percent energy efficiency. This shows that the LaOCl:Tb has approximately as great energy efficiency as ZnCdS:Ag, while LaOBr:Tb has been measured as somewhat higher than the sulfide phosphor. It should be appreciated that variations in manufacturing and measurement techniques may change these absolute figures somewhat, but the relative evaluations compared to the sulfide phosphors should not change when stoichiometric well-formed crystals of luminescent materials of the invention are used.

Table II below shows the relative brightness (percent B) and, in most instances, color in $x$ and $y$ units of the International Commission on Illumination of various cerium-sensitized, terbium-activated phosphors excited by 3,650 A. radiation. This sensitization does not occur with 2,537 A. excitation. This shows the best results with 15 mole percent terbium and 0.5 mole percent cerium. This proven sensitization by cerium is not predictable. It occurs in varying degrees in lanthanum and gadolinium oxychlorides and oxybromides only when activated with terbium, and not when activated by other rare earth elements including europium, samarium, holmium, dysprosium and thulium. The effect is greatest in lanthanum oxybromide.

TABLE II

[Relative brightness and color of various Ce-sensitized, Tb-activated phosphors under 3,650 A. excitation]

| Sample Number | Host | Moles Tb | Moles Ce | Relative percent B | Color $x$ | Color $y$ |
|---|---|---|---|---|---|---|
| 1 | LaOBr | .05 | None | 32.5 | 254 | 366 |
| 2 | LaOBr | .05 | .001 | 39.1 | 260 | 371 |
| 3 | LaOBr | .05 | .005 | 82.1 | 290 | 435 |
| 4 | LaOBr | .05 | .005 | 83.5 | 291 | 443 |
| 5 | LaOBr | .05 | .005 | 88.0 | 301 | 464 |
| 6 | LaOBr | .05 | .010 | 76.0 | 334 | 544 |
| 7 | LaOBr | .05 | .050 | 44.0 | 293 | 488 |
| 8 | LaOBr | .15 | None | 20.3 | | |
| 9 | LaOBr | .15 | .005 | 100.0 | 350 | 590 |
| 10 | LaOBr | .15 | .015 | 79.5 | 374 | 628 |
| 11 | LaOCl | .05 | .005 | 43.7 | | |
| 12 | GdOBr | .05 | .005 | 39.9 | 284 | 392 |
| 13 | GdOCl | .05 | None | 14.7 | | |
| 14 | GdOCl | .05 | .005 | 25.8 | | |

Furthermore, FIG. 3 shows about 0.6 mole percent Ce as giving optimum brightness in LaOBr:0.05Tb.

This sensitization to 3,650 A. radiation has particular advantages in high-pressure mercury lamp applications where that wavelength is the principal wavelength available for exciting a phosphor coating. The favorable maintenance of light output at elevated temperatures shown in table III below indicates that LaOBr:0.05Tb:0.005Ce can be used in such lamps. Relative percent brightness is shown in comparison to room temperature brightness taken as 100 percent.

TABLE III

Temperature Dependence of Brightness

| Phosphor | Temperature (°C.) | Relative % Brightness |
|---|---|---|
| LaOBr:0.05Tb:0.005Ce | 25 | 100 |
| LaOBr:0.05Tb:0.005Ce | 125 | 120 |
| LaOBr:0.005Tb:0.005Ce | 150 | 120 |
| LaOBr:0.05Tb:0.005Ce | 300 | 90 |

Thermoluminescence has been observed in the cerium-sensitized phosphor with images projected onto a layer of the phosphor by ultraviolet radiation staying dormant for at least 2½ days until the phosphor is heated into the temperature region of 100° to 400° C., at which time the images are brightly and faithfully reproduced.

What we claim as new and desire to secure by Letters Patent of the United States is:

1. An X-ray image converter device comprising luminescent material for converting X-radiation to light which luminescent material comprises well-formed crystals of a material essentially according to the formula:

$$LnOX:Tb^{+3}(:Ce)$$

wherein
Ln is one or more of La and Gd,
X is one or more of Cl, Br, and I,
Tb is present in activator concentrations from a small but effective amount for the production of light up to about 30 mole percent of the composition, and
Ce is optionally present as a sensitizer in the range of from about 0.1 to 1.0 mole percent,
said luminous material having radiant energy efficiency when excited by a 20-kilovolt cathode ray beam of at least about 10 percent.

2. An image converter device according to claim 1 comprising an electric discharge tube suitable for image intensification, a luminescent screen responsive to X-radiation, and a photocathode within said electric discharge tube and optically coupled to said screen, said luminescent screen comprising a phosphor capable of converting X-radiation to radiation of longer wavelength.

3. An image converter of claim 2 wherein said luminescent screen is within said electric discharge tube and is separated from said photocathode by not more than a small thickness of light-transmitting material.

4. An image converter of claim 2 wherein said luminescent screen is optically coupled to said photocathode by fiber optic means.

5. An image converter of claim 2 wherein said luminescent screen is optically coupled to said photocathode by means of at least one mirror surface.

6. The image converter of claim 2 wherein the phosphor is a terbium-activated lanthanum oxychloride.

7. The image converter of claim 2 wherein the phosphor is a terbium-activated lanthanum oxybromide.

8. The image converter of claim 2 wherein the phosphor is a terbium-activated lanthanum oxyiodide.

9. The image converter of claim 2 wherein the phosphor is a terbium-activated gadolinium oxyhalide.

10. An image converter device according to claim 1 comprising a radiographic intensifier luminescent screen which comprises a phosphor supported on a member, said phosphor being capable of converting X-radiation to radiation of longer wavelength.

11. A luminescent screen of claim 10 adopted for intensifying the exposure of film to X-radiation.

12. A luminescent screen of claim 10 in the form of a fluoroscopic screen for observing an object in motion while subjected to X-radiation.

* * * * *